US011647121B2

(12) United States Patent
Naidu et al.

(10) Patent No.: US 11,647,121 B2
(45) Date of Patent: *May 9, 2023

(54) METHOD AND APPARATUS FOR SUPPORTING INTERNET CALL SESSIONS IN A COMMUNICATION NETWORK

(71) Applicant: AT&T Intellectual Property I, L.P., Atlanta, GA (US)

(72) Inventors: Lakshminarashimhan Naidu, Pearland, TX (US); Bernard S. Ku, Austin, TX (US); Thomas P. Benzaia, Sugar Land, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,512

(22) Filed: Apr. 28, 2022

(65) Prior Publication Data

US 2022/0256037 A1      Aug. 11, 2022

Related U.S. Application Data

(63) Continuation of application No. 17/159,336, filed on Jan. 27, 2021, now Pat. No. 11,349,992, which is a (Continued)

(51) Int. Cl.
*H04L 65/1104*     (2022.01)
*H04M 3/56*     (2006.01)
(Continued)

(52) U.S. Cl.
CPC ......... *H04M 3/567* (2013.01); *H04L 65/1104* (2022.05); *H04L 65/65* (2022.05); *H04M 7/006* (2013.01)

(58) Field of Classification Search
CPC .... H04M 3/567; H04M 7/006; H04M 7/0072; H04M 7/0075; H04L 65/1104; H04L 65/65; H04L 65/1016; H04L 65/1069
See application file for complete search history.

(56) References Cited

U.S. PATENT DOCUMENTS 8,477,941 B1     7/2013   Dhanoa et al.
8,553,685 B2    10/2013   Ballard et al.
(Continued)

FOREIGN PATENT DOCUMENTS

CN           103188217 B      3/2017
WO         2017088556 A1      6/2017

*Primary Examiner* — Kibrom T Hailu
(74) *Attorney, Agent, or Firm* — Guntin & Gust, PLC; Kenneth Kwan

(57) ABSTRACT

Aspects of the subject disclosure may include, for example, including a processing system for performing operations for determining service requirements of a call session at first user equipment associated with a communication network, determining a first codec to facilitate the call session at the first user equipment according to the service requirements of the call session, searching a session border controller table according to the first codec to obtain a first resource identifier associated with a first session border controller type to facilitate the call session at the user equipment, receiving a first address of a first session border controller associated with the communication network from a domain name server associated with the communication network responsive to a first query including the first resource identifier, and sending a first transport protocol message to the first session border controller according to the first address. Other embodiments are disclosed.

20 Claims, 8 Drawing Sheets

Related U.S. Application Data continuation of application No. 16/288,908, filed on Feb. 28, 2019, now Pat. No. 10,938,991.

(51) Int. Cl.
    *H04M 7/00*         (2006.01)
    *H04L 65/65*        (2022.01)

(56) References Cited

U.S. PATENT DOCUMENTS

| | | |
|---|---|---|
| 8,958,282 B2 | 2/2015 | Ballard |
| 9,225,752 B2 | 12/2015 | Boucadair et al. |
| 9,444,854 B2 | 9/2016 | Piscopo |
| 10,033,709 B1 | 7/2018 | Hassan et al. |
| 10,938,991 B2 * | 3/2021 | Naidu ............... H04L 65/1069 |
| 11,165,833 B2 | 11/2021 | Corona et al. |
| 11,349,992 B2 * | 5/2022 | Naidu ............... H04M 7/0075 |
| 2008/0159261 A1 | 7/2008 | Bessis |
| 2009/0059894 A1 * | 3/2009 | Jackson ............... H04L 61/106 370/352 |
| 2009/0161666 A1 | 6/2009 | Ku |
| 2009/0168986 A1 * | 7/2009 | Jackson ............... H04M 3/54 379/211.01 |
| 2011/0090900 A1 | 4/2011 | Jackson et al. |
| 2011/0096788 A1 | 4/2011 | Ballard et al. |
| 2011/0113141 A1 | 5/2011 | Veenstra et al. |
| 2011/0141879 A1 | 6/2011 | Ballard |
| 2012/0294302 A1 | 11/2012 | Ku et al. |
| 2015/0201086 A1 | 7/2015 | Abi et al. |
| 2016/0173539 A1 | 6/2016 | Siegel et al. |
| 2018/0034971 A1 | 2/2018 | Ku |
| 2018/0077229 A1 | 3/2018 | Bharrat et al. |
| 2018/0255109 A1 | 9/2018 | Naidu et al. |
| 2018/0337849 A1 | 11/2018 | Sharma et al. |
| 2020/0280637 A1 | 9/2020 | Naidu et al. |
| 2021/0152694 A1 | 5/2021 | Naidu et al. |

* cited by examiner

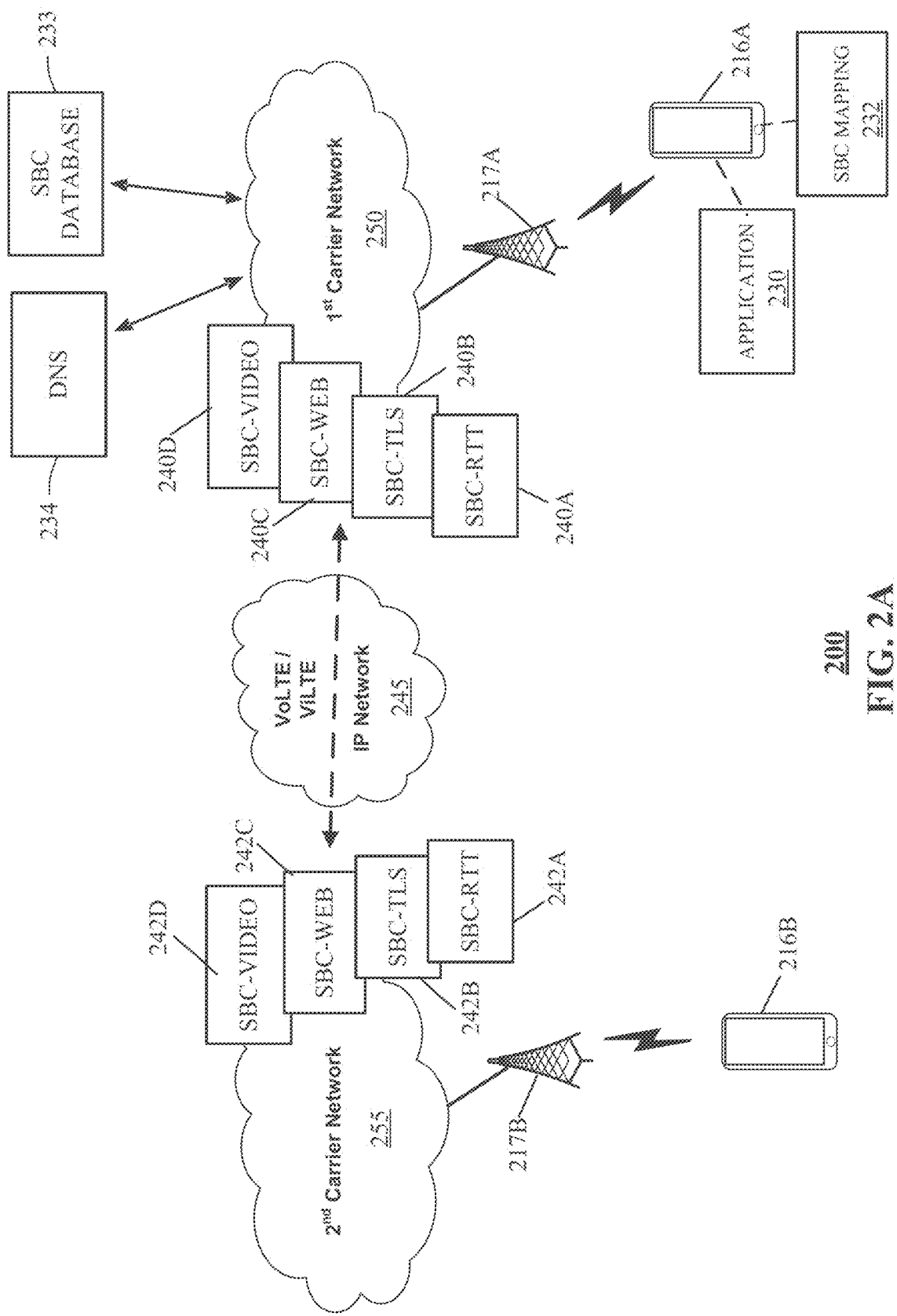

METHOD AND APPARATUS FOR SUPPORTING INTERNET CALL SESSIONS IN A COMMUNICATION NETWORK

CROSS REFERENCE TO RELATED APPLICATIONS

This application is a continuation of and claims priority to U.S. patent application Ser. No. 17/159,336, filed Jan. 27, 2021, which is a continuation of and claims priority to U.S. patent application Ser. No. 16/288,908, filed Feb. 28, 2019, now issued as U.S. Pat. No. 10,938,991. The contents of each of the foregoing are hereby incorporated by reference into this application as if set forth herein in full.

FIELD OF THE DISCLOSURE

The subject disclosure relates to a method and apparatus for supporting internet call sessions in a communication network.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

DETAILED DESCRIPTION

Figure 1:
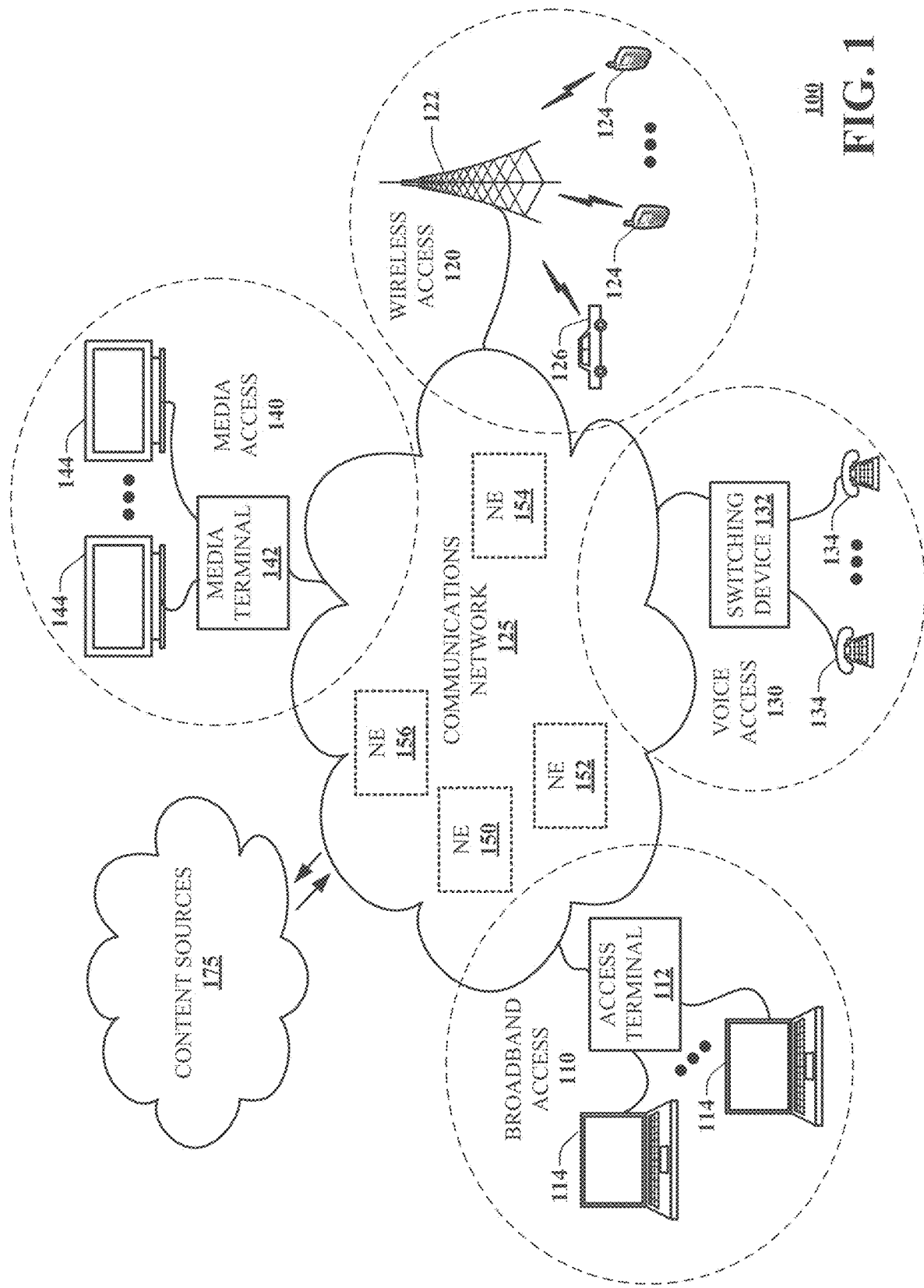
FIG. 1 is a block diagram illustrating an exemplary, non-limiting embodiment of a communications network in accordance with various aspects described herein.

The subject disclosure describes, among other things, illustrative embodiments for selecting a Session Border Controller (SBC) server to support IP-based multimedia services for call sessions in a communication system, such as a Long-Term Evolution (LTE) system. Voice-over-LTE (VoLTE), Video-over-LTE (ViLTE), or video streaming services may use SBC services that provide processing of real-time audio and/or video streams, real-time text services, and/or transport layer security within IP-based communication networks, such as an IP Multimedia Subsystems (IMS). An application executing at a communication device can detect a request to initiate a call session and can determine a codec required for providing media services to the communication device involved in the call session. The application can access a database that associates available codecs with resource identifiers of known types of SBC available within the IMS system. The application can then use the resource identifier to transmit a request to a domain name server (DNS) for the type of SBC for providing the required services to the communication device. Other embodiments are described in the subject disclosure.

One or more aspects of the subject disclosure include a method, operating at a processing system including a processor. The method can include detecting a first request to initiate a call session at first user equipment associated with a communication network and, in turn, determining service requirements of the call session according to the first request. The method can also include determining a first codec to facilitate the call session at the first user equipment according to the service requirements of the call session and, in turn, searching a session border controller table according to the first codec to obtain a first resource identifier associated with a first session border controller type to facilitate the call session at the user equipment. The method can further include sending a first query including the first resource identifier associated with the first session border controller type to a domain name server associated with the communication network and, in turn, receiving a first address of a first session border controller associated with the communication network from the domain name server responsive to the sending of the first query. The method can include sending a first transport protocol message to the first session border controller according to the first address. The first session border controller can facilitate the call session including the service requirements at the user equipment via the communication network.

One or more aspects of the subject disclosure include a machine-readable storage medium, including executable instructions that, when executed by a processing system including a processor, facilitate performance of operations, including determining a first codec to facilitate a call session at first user equipment associated with a communication network according to service requirements of the call session. The operations can include searching a session border controller table according to the first codec to obtain a first resource identifier associated with a first session border controller type to facilitate the call session at the user equipment. The operations can also include sending a first query including the first resource identifier associated with the first session border controller type to a domain name server associated with the communication network and, in turn, receiving a first address of a first session border controller associated with the communication network from the domain name server responsive to the sending of the first query. The operations can include sending a first transport protocol message to the first session border controller according to the first address. The first session border controller can facilitate the call session including the service requirements at the user equipment via the communication network.

One or more aspects of the subject disclosure include a device including a processing system including a processor, and a memory that stores executable instructions that, when executed by the processing system, facilitate performance of operations. The processing system, responsive to executing the executable instruction, can perform operations for determining service requirements of a call session at first user equipment associated with a communication network and, in turn, determining a first codec to facilitate the call session at the first user equipment according to the service requirements of the call session. The operations can also include searching a session border controller table according to the first codec to obtain a first resource identifier associated with a first session border controller type to facilitate the call session at the user equipment. The operations can further include receiving a first address of a first session border controller associated with the communication network from a domain name server associated with the communication network responsive to a first query including the first resource identifier; and, in turn, sending a first transport protocol message to the first session border controller according to the first address. The first session border controller can facilitate the call session including the service requirements at the user equipment via the communication network.

Referring now to FIG. 1, a block diagram is shown illustrating an example, non-limiting embodiment of a communications network 100 in accordance with various aspects described herein. For example, communications network 100 can facilitate in whole or in part providing a Session Border Controller (SBC) server to support IP-based multimedia services for call sessions in a communication system. The communications network 100 can detect a request for a call session, determine a codec required for providing media services to the communication device in the call session, search for a resource identifier of a known type of SBC based on the codec, and use the resource identifier to access a SBC based on a request to a Domain Naming Server (DNS). In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system functioning within the communication network of FIG. 1 in accordance with various aspects described herein. FIG. 2A depicts an illustrative embodiment of a system 200 for enabling IP carrier peering. In particular, the system 200 may provide for carrier routing for subscriber devices 216A of a first carrier network 250 to locate and connect with subscriber devices 216B of a second carrier network for full IP-capable calling, such as VoLTE, ViLTE, or a video streaming service. IP-capable calling devices 216A-B, can be wired devices or wireless devices 216A.

In one or more embodiments, a first mobile communication device 216A can be wirelessly connected to a first carrier network 250 via a first mobility network 217 and a second mobile communication device 216B can be wirelessly connected to a second carrier network 255 via a second mobility network 217B. The first communication device 216A of the first carrier network 250 can initiate to an IP-capable call session with a second communication device 216B of a second carrier network 255, then a IP-capable call session can be established using an IP Network 245, such the digital data associated with the call session is transacted between the first carrier network 250 and the second carrier network 255 using the Internet rather than using a non-IP connection, such as a public switched telephone network (PSTN) or a cellular 2G/3G connection.

In one or more embodiments, the system 200 to complete connection can use one or more SBC servers 240A-D and 242A-D to provide secured connectivity between the first and second carrier networks 250, 255 and the IP Network 245 during a call session. Each SBC server 240A can include provide functions for controlling data streams associated with one or more call sessions. Each call session can include signaling, such as Session Initiation Protocol (SIP) messages that can control various aspects of the call session from initiation, quality control, through closing the call session. Each SBC server 240A can provide a point of demarcation between each network 245-255 invoked in the call session. Each SBC server 240A influences the data streams that are included in the call sessions by providing service capabilities, such as measurement, access control, and data conversion facilities for the call sessions.

In one or more embodiments, each SBC server 240A can include one or more functions, including security functions, connectivity functions, quality of service of functions, regulatory functions, media service functions, statistical functions, and billing functions. Examples of Security functions that may be included in a SBC server 240A include protection against malicious attacks, such as Denial-of-Service (DoS) attacks, encryption of signaling protocols, such as Transport Layer Security (TLS) or Secure Real-time Transport Protocol (SRTP), malformed packet protection, and protection against toll fraud. Examples of Connectivity functions that may be included in a SBC server 240A include protocol translations, IPv4 to IPv6 address interworking, SIP normalization and header manipulation, and Virtual Private Network (VPN) connectivity. Examples of Quality of Service (QoS) functions that may be included in a SBC server 240A include rate limiting, resource allocation, and call admission control. Examples of Regulatory functions that may be included in a SBC 240A include emergency call prioritization (911) and lawful interception of call capability. Examples of Media functions that may be included in a SBC server 240A include media transcoding, support for video calling, support for audio calling, and tone/announcement services.

In one or more embodiments, each network 250 can include various types of SBC servers 240A-D, which can be configured to include particular SBC server functions or combinations of functions. For example, the first carrier network 250 can include a SBC server 240A that implements a Real-Time Text (RTT) service, such as in SBC-RTT 240A. RTT allows text to be transmitted instantly from, for example, the first communication device 216A to the second communication device 216B as that text is type or created. In another example, the first carrier network 250 can include a SBC server 240B that implements a TLS service as part its set of security functions, such as in SBC-TLS 240B. The TLS service can contain cryptographic protocols for use in protection of web browsing, email, instant messaging, and VoIP communications. In another example, the first carrier network 250 can include a SBC server 240C that implements a web client service, such as in SBC-WEB 240C. The web client service can enable a client application 230 at the first communication device 216A to connect to a web server via the IP Network 245. In another example, the first carrier network 250 can include a SBC server 240D that implements a video service, such as in SBC-VIDEO 240D. The video service can support video calls, or video-over-IP, or video-over-LTE (ViLTE). In one or more embodiments, each SBC server 240A is a fundamental element in the IP-based communications network, which can host a Proxy Call Session Control Function, such as an IP Multimedia Subsystem (IMS) based VoLTE network or a Digital Video Streaming (DVS) network.

In one or more embodiments, the system 200 can address the need for selecting and accessing the right type of SBC server 240A-D for supporting a particular IP-based multimedia service that is associated with a call session. For example, a user of the first communication device 216A may initiate any of various types of call sessions. These call session can include, but are not limited to, a VoLTE-to-VoLTE call session, a Softphone-to-VoLTE call session, an RTT application-to-ViLTE call session, or a video streaming-to-mobile device call session. Each of these call sessions can be invoked either directly by the hardware of the first communication device 216A or by an application 230 resident on the first communication device 216A. For example, a VoLTE calling function can be an Original Equipment Manufacturing (OEM) function of the communication device 216A, while a Softphone function can be an application 230 loaded onto the communication device 216A for emulating a function such as VoLTE calling. Either way, the first communication device 216A can initiate a variety of call session types, and the first carrier network 250 can be connected to many communication devices 216A and support a variety of call sessions and call session types occurring simultaneously. Each of these different call session types can require a different set of functions or services from whichever SBC server 240A the first carrier network 250 uses for provision of SBC functionality.

When an IP-based Voice/Video call session (VoLTE/ViLTE) is initiated, a SBC server 240A with appropriate features/services is needed. If it turns out that the first carrier network 250 has selected an incorrect type of SBC server 240A, then it must reselect a new SBC server 240B, which can cause a significant delay in call session initiation, sometimes in a range of many seconds, which can, in turn, delay call control setup and connection to the correct SBC server 240A. In a robust ViLTE service deployment, this will result in reduced customer satisfaction, increased churn rate and overall poor customer retention. Alternatively, if the first communication network 250 selects a "marginally correct but non-optimal" SBC server 240A, then session performance can suffer, again resulting in reduced customer satisfaction.

In one or more embodiments, the first communication device 216A can select a type of SBC server 240A for servicing a call session based on services/functions required by the call session. In one or more embodiments, an application 230 at the first communication device 216A can detect a request for a call session. The call session can be in incoming or outgoing request. The application 230 can examine the request to determine the services/functions that are required for the particular type of call session. In one embodiment, the application 230 can access historical data and/or user profile data to determine which services/functions are needed to facilitate the call session. For example, a "standard" VoLTE-to-VoLTE call session may or may not require RTT capability depending on a user preference that is stored in a user profile for the first communication device 216A. User-specific preferences can be selected by the user or can be developed from historical logging of prior call sessions. For example, a user's profile may change based on recent changes in usage of services/functions associated with call sessions In one or more embodiments, the first communication device 216A can include a table or database for SBC Mapping 232. The SBC Mapping 232 provide a means for mapping required functions/services for a call session to a types of SBC servers 240A-D. The SBC Mapping 232 can correlate parameters and/or configurations of services, functions, and/or protocols required for various types of call sessions to one or more DNS Resource records. For example, the SBC Mapping 232 can be in the form of a SBC Mapping Table that correlates SBC functional Codec parameters to Universal Resource Identifiers (URI) and/or Fully Qualified Domain Names (FQDN) associated with one or more SBC servers 240A-D. In one example, the application 230 can detect a request for a call session at the first communication device 216A. The application 230 can determine, based on the context of the call session, a user profile, or other factors, that the call session requires one or more functions or services from a SBC server 240A. These services/functions can be correlated to a particular Codec parameter. The application 230 can then access the SBC Mapping 232 and search the SBC Mapping 232 for a URC of a SBC server 240A that corresponds to the particular Codec parameter. For example, the call session may require a RTT service. The RTT service can be assigned a Codec of "RTT". The Application 230 can search the SBC Mapping 232 for the "RTT" Codec and return a corresponding URI of "_rtt_udp.sbc.att.net."

In one or more embodiments, the Application 230 can now contact a DNS Resource 234. The Application 230 can query the DNS 234 for an address of a SBC 240A corresponding to the URI of "_rtt_udp.sbc.att.net." The DNS Resource 234 can return an IP Address for the correct or most appropriate SBC server 240A for this purpose. In this example, the DNS Resource 234 can return the IP Address for the SBC-RTT server 240A. The Application 230 can use this IP Address to connect to the SBC-RTT server 240A. For example, the Application 230 can cause the first communication device 216A to send an SIP INVITE message to the SBC-RTT server 240A in order to request an origination of the call session. In one embodiment, the SBC-RTT server 240 can use the SIP INVITE message to contact a Proxy Call Session Control Function (P-CSCF), which, in turn, can contact a Serving CSCF (S-CSCF) for originating the call session. The call session, once originated, can use the IP Network 245 to contact the second Carrier Network 255. The second Carrier Network 255 can receive the SIP INVITE message from the first Carrier Network 250, and can, in turn, direct the SIP INVITE message to a terminating S-CSCF. The terminating S-CSCF can cause the SIP INVITE message to be forwarded to one of the SBC servers 242A-D at the second Carrier Network 255. In one embodiment, the SIP INVITE message that is received at the second Carrier Network 255 from the first Carrier Network 250 can include an IP Address for a corresponding SBC server 242A that is appropriate for this type of call session. For example, a call session that requires a RTT service/function and uses a SBC-RTT server 240A at the first Carrier Network 250 can automatically select a SBC-RTT server 240B at the second Carrier Network 255. Once the call session is established, the SBC server pair of SBC-RTT 240A and SBC-RTT 242A can take over the call session and automatically invoke the needed services/functions for initiating, conducting, and terminating the call session between the first communication device 216A and the second communication device 216B.

In one or more embodiments, the SBC Mapping 232 can be stored in the first communication device 216A. The SBC Mapping 232 can be updated or maintained by downloading data to the SBC Mapping from a SBC Database 233 at the first Carrier Network 250. For example, the first Carrier Network 250 can use the SBC Database 233 to update the SBC Mapping 232 at various communication devices 216A on a periodic basis. Alternatively, the SBC Mapping 232 can be updated whenever data at the SBC Database 233 is changed.

Figure 2B:
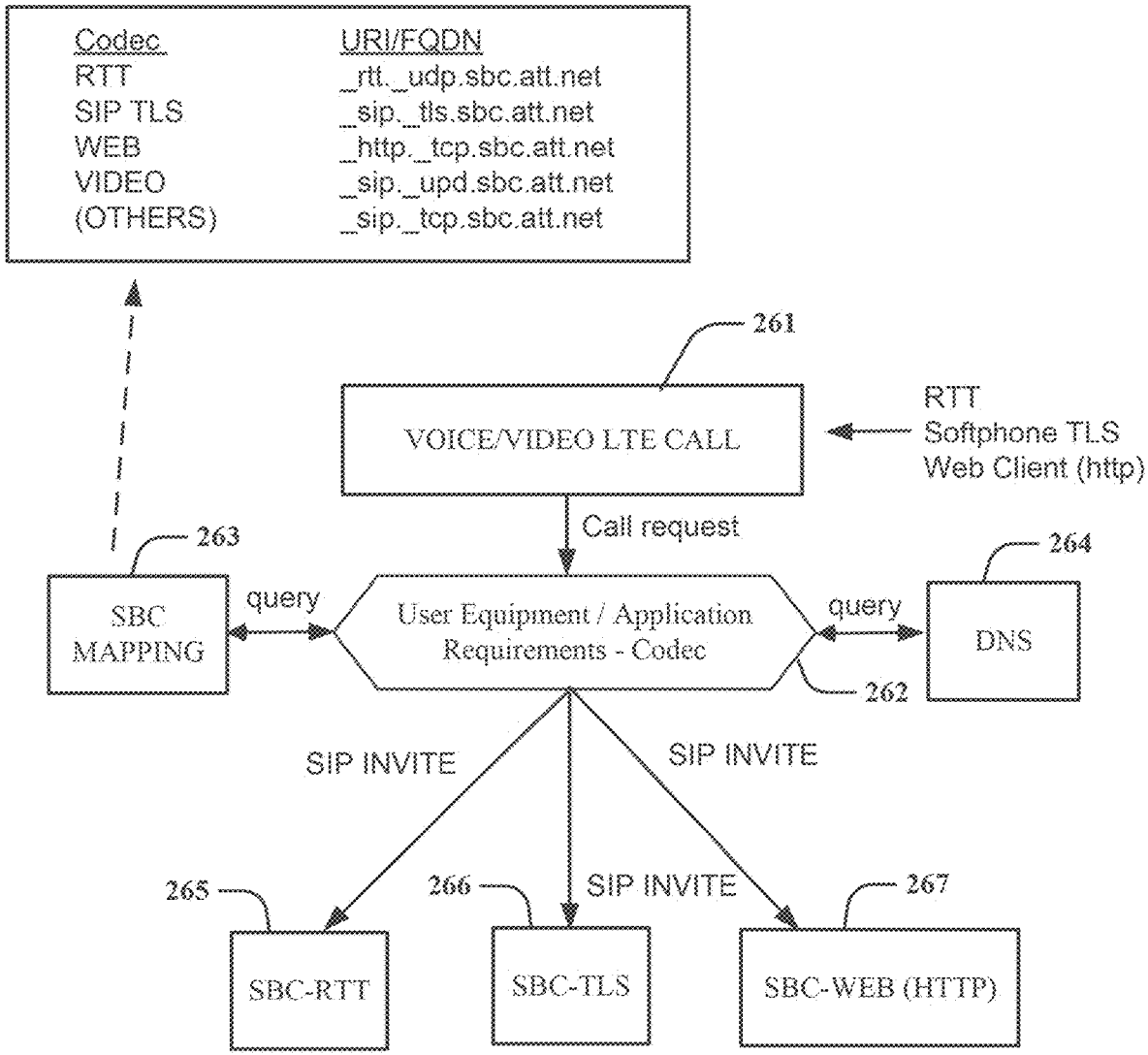
FIG. 2B is a flow diagram illustrating an example, non-limiting embodiment of a system functioning within the communication network of FIG. 1 in accordance with various aspects described herein.

FIG. 2B is a flow diagram illustrating an example, non-limiting embodiment of a system functioning within the communication network of FIG. 1. The flow diagram can include a call session flow 260. The call session flow 260 can include a call session can be initiated for a VoLTE or ViLTE call in step 261. The call session can be initiated, directly, by a communication device or by an application executing at a communication device. The communication device/application can determine the requirements for the call session in step 262. The requirements can be used to determine a Codec parameter corresponding to the requirements. The communication device/application can access a SBC Mapping. The SBC Mapping can be searched, using the Codec parameter, to obtain a URI/FQDN for a SBC server corresponding to the Codec parameter in step 263. Once the URI/FQDN is obtained, the communication device/application can access a DNS resource to obtain an IP address for the SBC server corresponding to the URI/FQDN in step 264. The communication device/application can direct a SPI INVITE message to the SBC server, such as SBC-RTT 265, SBC-TLS 266, or SBC-WEB (HTTP) 267.

In one example use case, the call session may be a VoLTE that utilizes RTT. In this case, the User End application (UEA) requires access to a RTT service. The UEA will therefore require an RTT-enabled P-CSCF to initiate a RTT voice or text message (e.g., a VoLTE TTY service). The UEA and access the SBC Mapping to obtain the URI/FQDN. The UEA can perform a query at the DNS server based on the RTT service requirement. The DNS server can return an IP address of the correct SBC server that can provide the RTT service. The SIP (Signaling) Path can include:

UEA (_rtt._udp.sbc.att.com)←-→DNS (RTT ip address), and

UEA←-→RTT SBC←-→I/S-CSCF←-→AS.

The resulting Media (Bearer) Path can include:

UEA←-→RTT SBC.

In one example use case, the call session may be a VoLTE that is initiated by a Softphone using TLS. In this case, the User End application (UEA) requires access to a TLS service. The UEA will therefore require a Softphone/TLS-enabled P-CSCF to initiate a TLS voice or text message. The UEA and access the SBC Mapping to obtain the URI/FQDN. The UEA can perform a query at the DNS server based on the TLS service requirement. The DNS server can return an IP address of the correct SBC server that can provide the TLS service. The SIP (Signaling) Path can include:

UEA (_sip._tls.sbc.att.com)←-→DNS (Softphone IP address), and

UEA←-→Softphone/TLS SBC←-→I/S-CSCF←-→AS.

The resulting Media (Bearer) Path can include:

UEA←-→Softphone/TLS SBC.

In one or more embodiments, that system 200 can provide a simple dynamic mechanism for providing SBC sever selection in an IMS network. The system 200 can eliminate or reduce multiple retries and/or delays in addressing and accessing a SBC server. The system can optimize selection of SBC servers for providing convergent and/or multimedia service while improving the efficiency of communication and reducing traffic delays.

Figure 2C:
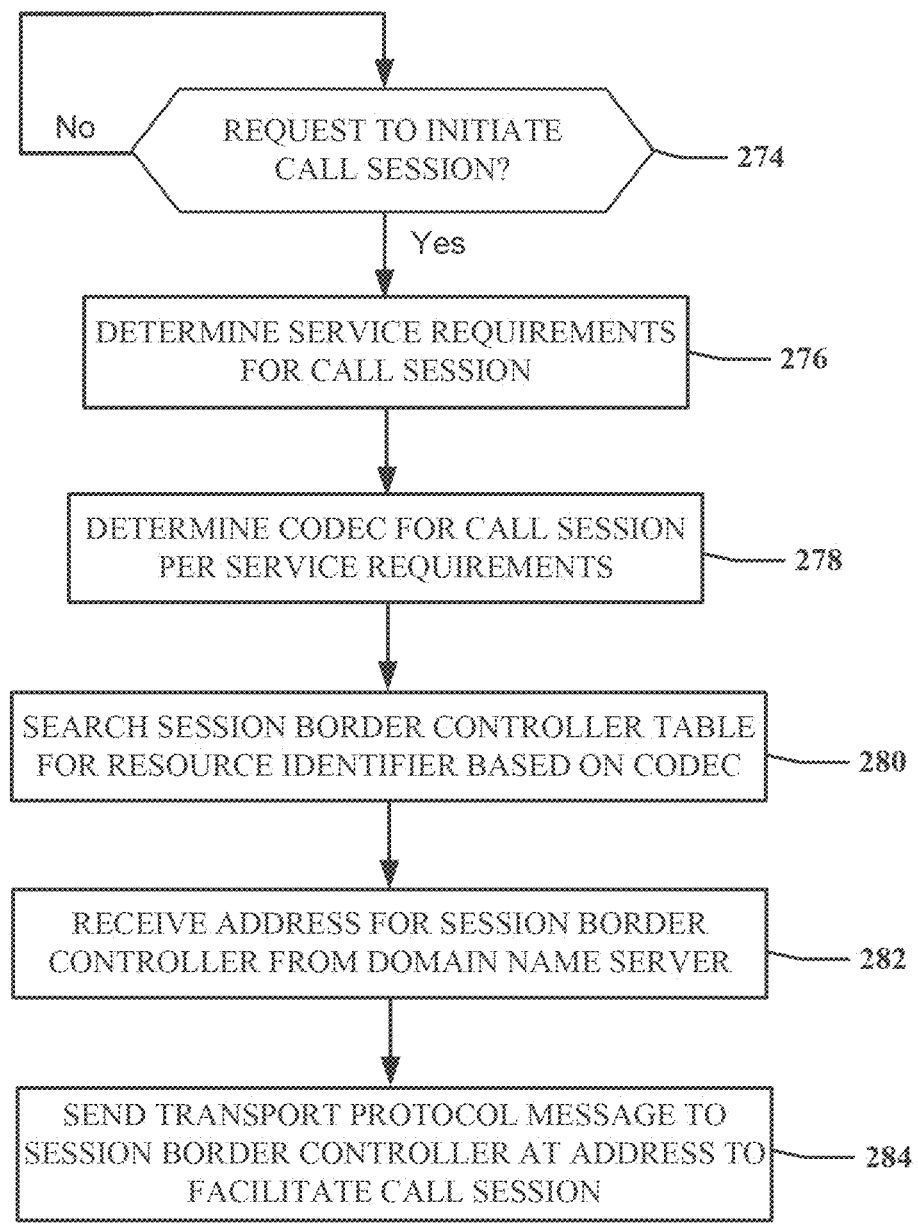
FIG. 2C depicts an illustrative embodiment of a method in accordance with various aspects described herein.

FIG. 2C depicts an illustrative embodiment of a method in accordance with various aspects described herein. A communication device can detect a request to initiate a call session, such as a VoLTE or ViLTE session at step 274. If a call session is detected, then the communication device can determine service/function requirements for providing the call session at step 276. The communication device can determine a codec parameter for the call session according the service/function requirement, in step 278, and, in turn, search a SBC table for a resource identifier based on the Codec parameter, in step 280. The communication device requests and receives an IP address for the SBC server from a DNS resource based on the resource identifier, in step 282, and, in turn, sends a transport protocol message to the SBC server at the IP address to facilitate the call session, in step 284.

While for purposes of simplicity of explanation, the respective processes are shown and described as a series of blocks in FIG. 2X, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
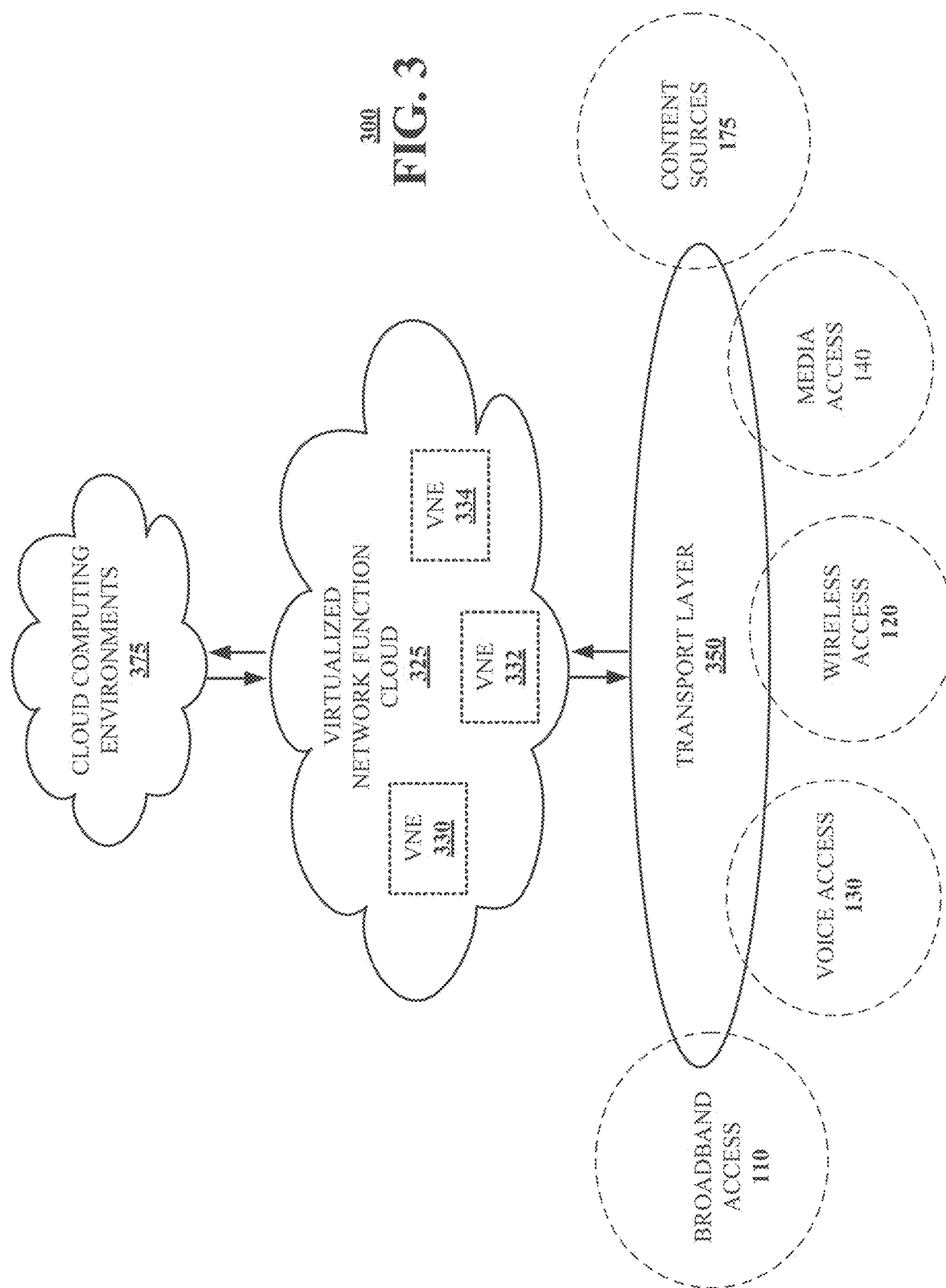
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, call session flow 250, and method 270 presented in FIGS. 1, 2A, 2B, 2C, and 3. For example, the virtualized communication network 300 can facilitate in whole or in part selecting SBC servers for providing services/functions in support of an IP-based call session. After detecting a call session request, a communication device communicatively coupled to the virtualized communication network 300 can determine a Codec parameter based on services/functions required for the call session. The Codec parameter can, in turn, be used to search for a resource identifier corresponding to a capable SBC server from a SBC table. The communication device can query a DNS resource for an IP address for the SBC server and, in turn, use the IP address to initiate the call session via the SBC server.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
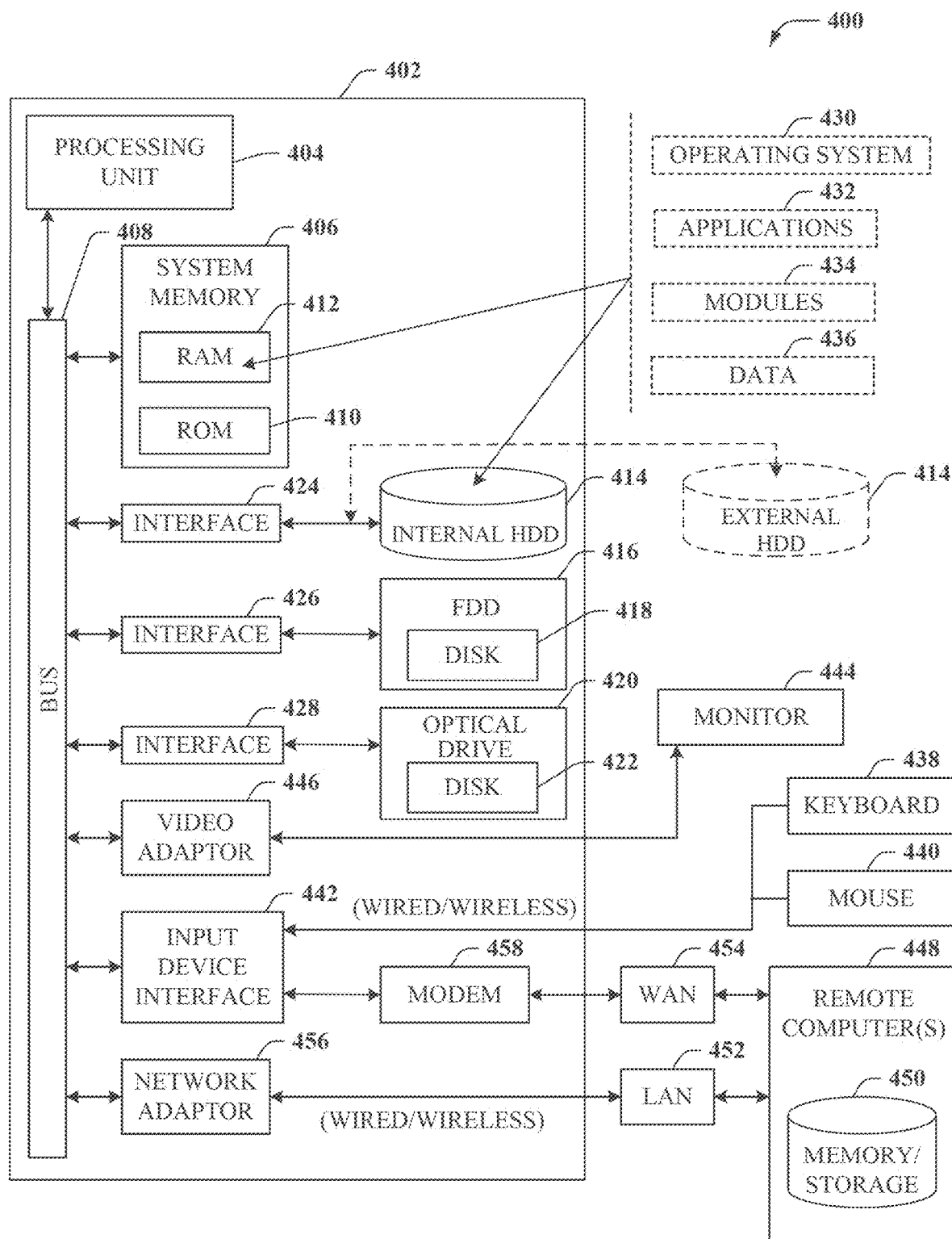
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a communication device capable for selecting SBC servers for providing services/functions in support of an IP-based call session. After detecting a call session request, a communication device including the computing environment 400 can determine a Codec parameter based on services/functions required for the call session. The Codec parameter can, in turn, be used to search for a resource identifier corresponding to a capable SBC server from a SBC table. The communication device can query a DNS resource for an IP address for the SBC server and, in turn, use the IP address to initiate the call session via the SBC server.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
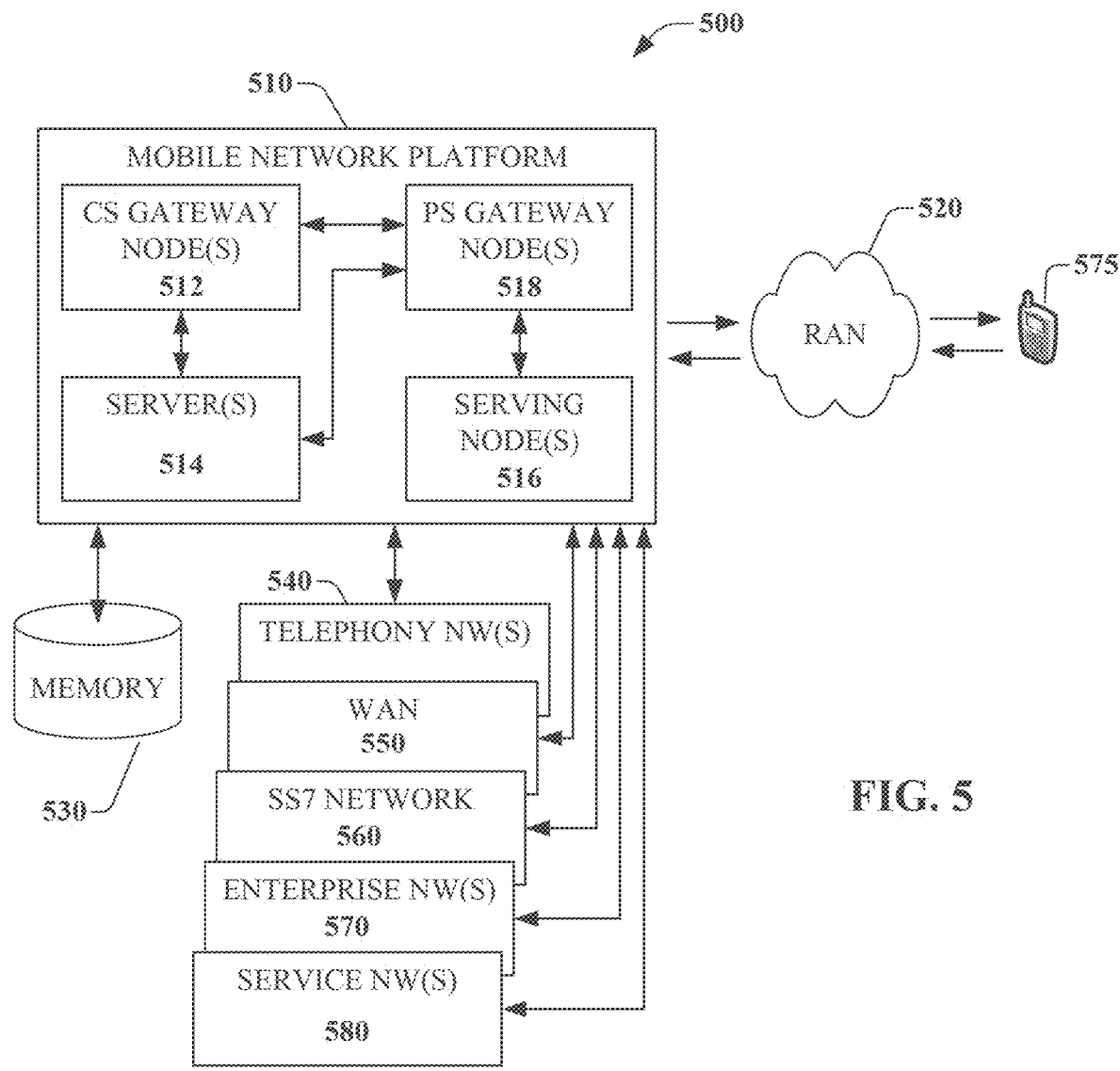
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part selecting SBC servers for providing services/functions in support of an IP-based call session. After detecting a call session request, a communication device communicatively coupled to the platform 510 can determine a Codec parameter based on services/functions required for the call session. The Codec parameter can, in turn, be used to search for a resource identifier corresponding to a capable SBC server from a SBC table. The communication device can query a DNS resource for an IP address for the SBC server and, in turn, use the IP address to initiate the call session via the SBC server.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG)) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
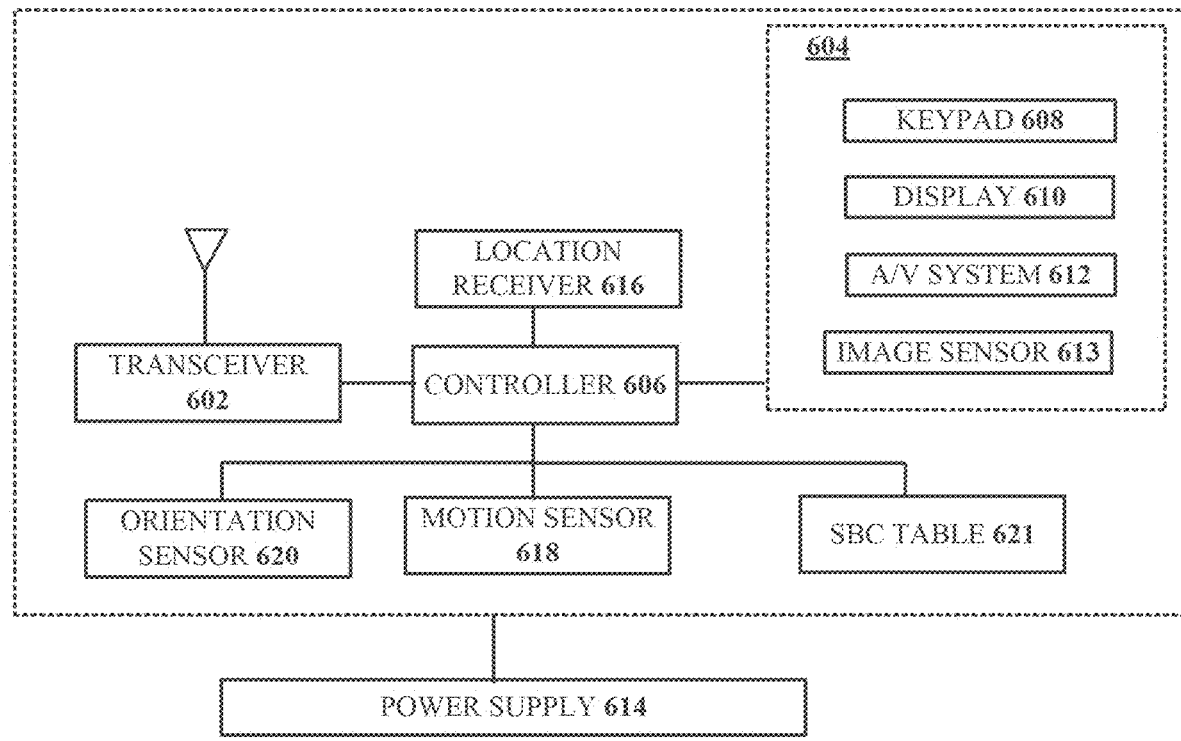
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a communication device capable for selecting SBC servers for providing services/functions in support of an IP-based call session. After detecting a call session request, a communication device including the computing device 600 can determine a Codec parameter based on services/functions required for the call session. The Codec parameter can, in turn, be used to search for a resource identifier corresponding to a capable SBC server from a SBC table 621. The communication device can query a DNS resource for an IP address for the SBC server and, in turn, use the IP address to initiate the call session via the SBC server.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

receiving, by a processing system including a processor, a first query that includes a first resource identifier associated with a first session border controller type, wherein the first session border controller type corresponds to a first codec identified for facilitating a call session at a user equipment according to service requirements of the call session, and wherein the user equipment is associated with a communication network;

providing, by the processing system, a first address of a first session border controller associated with the communication network responsive to the receiving the first query, wherein the providing the first address enables a first transport protocol message to be sent to the first session border controller according to the first address to cause the first session border controller to facilitate the call session at the user equipment via the communication network;

receiving, by the processing system, a second query that includes a second resource identifier associated with a second session border controller type, wherein the second session border controller type corresponds to a second codec identified for facilitating a modified call session at the user equipment according to modified service requirements; and providing, by the processing system, a second address of a second session border controller associated with the communication network responsive to the receiving the second query, wherein the providing the second address enables a second transport protocol message to be sent to the second session border controller according to the second address to cause the second session border controller to facilitate the modified call session at the user equipment via the communication network.

2. The method of claim 1, wherein the user equipment comprises a smart phone device.

3. The method of claim 1, wherein the user equipment comprises a device executing a phone emulating application.

4. The method of claim 1, wherein the call session comprises a voice-over-IP function or a video-over-IP function.

5. The method of claim 1, wherein the service requirements of the call session include real-time text service, transport layer security, softphone emulation, web capability, video capability, or any combination thereof.

6. The method of claim 1, wherein the first resource identifier comprises a fully qualified domain name.

7. The method of claim 1, wherein the first transport protocol message comprises a session initiation protocol message, a session announcement protocol message, or a real-time streaming protocol message.

8. The method of claim 1, wherein the first session border controller facilitates the call session by way of a call session control function of an internet protocol multimedia system.

9. The method of claim 1, wherein the first transport protocol message includes a mapping between a payload code associated with the call session and a codec identifier associated with the user equipment.

10. The method of claim 1, wherein the modified service requirements include conferencing multiple devices into the modified call session.

11. The method of claim 1, wherein the second resource identifier comprises a fully qualified domain name.

12. A non-transitory machine-readable storage medium, comprising executable instructions that, when executed by a processing system including a processor, facilitate performance of operations, comprising:

obtaining a first query that includes a first resource identifier associated with a first session border controller type, wherein the first session border controller type corresponds to a first codec identified for facilitating a call session at a user equipment, and wherein the user equipment is associated with a communication network;

transmitting a first address of a first session border controller associated with the communication network responsive to the obtaining the first query, wherein the transmitting the first address causes a first transport protocol message to be sent to the first session border controller according to the first address such that the first session border controller facilitates the call session at the user equipment via the communication network;

obtaining a second query that includes a second resource identifier associated with a second session border controller type, wherein the second session border controller type corresponds to a second codec identified for facilitating a modified call session at the user equipment; and transmitting a second address of a second session border controller associated with the communication network responsive to the obtaining the second query, wherein the transmitting the second address causes a second transport protocol message to be sent to the second session border controller according to the second address to such that the second session border controller facilitates the modified call session at the user equipment via the communication network.

13. The non-transitory machine-readable storage medium of claim 12, wherein the operations further comprise:
   detecting a first request to initiate the call session at the user equipment; and
   determining service requirements of the call session according to the first request.

14. The non-transitory machine-readable storage medium of claim 13, wherein the service requirements of the call session include real-time text service, transport layer security, softphone emulation, web capability, video capability, or any combination thereof.

15. The non-transitory machine-readable storage medium of claim 12, wherein the second resource identifier comprises a fully qualified domain name.

16. The non-transitory machine-readable storage medium of claim 12, wherein the modified call session is associated with modified service requirements relating to conferencing of multiple devices.

17. The non-transitory machine-readable storage medium of claim 12, wherein the first session border controller facilitates the call session at the user equipment by way of a call session control function of an internet protocol multimedia system.

18. A device, comprising:
   a processing system including a processor; and
   a memory that stores executable instructions that, when executed by the processing system, facilitate performance of operations, comprising:
   receiving a first resource identifier associated with a first session border controller type, wherein the first session border controller type corresponds to a first codec identified for facilitating a call session at a user equipment according to service requirements of the call session, and wherein the user equipment is associated with a communication network;
   providing a first address of a first session border controller associated with the communication network responsive to the receiving the first resource identifier, wherein the providing the first address results in a first transport protocol message being transmitted to the first session border controller to cause the first session border controller to facilitate the call session at the user equipment via the communication network;
   receiving a second resource identifier associated with a second session border controller type, wherein the second session border controller type corresponds to a second codec identified for facilitating a modified call session at the user equipment according to modified service requirements; and
   providing a second address of a second session border controller associated with the communication network responsive to the receiving the second resource identifier, wherein the providing the second address results in a second transport protocol message being sent to the second session border controller to cause the second session border controller to facilitate the modified call session at the user equipment via the communication network.

19. The device of claim 18, wherein the call session comprises a voice-over-IP function or a video-over-IP function.

20. The device of claim 18, wherein the first resource identifier comprises a fully qualified domain name.

* * * * *